Figure 1:
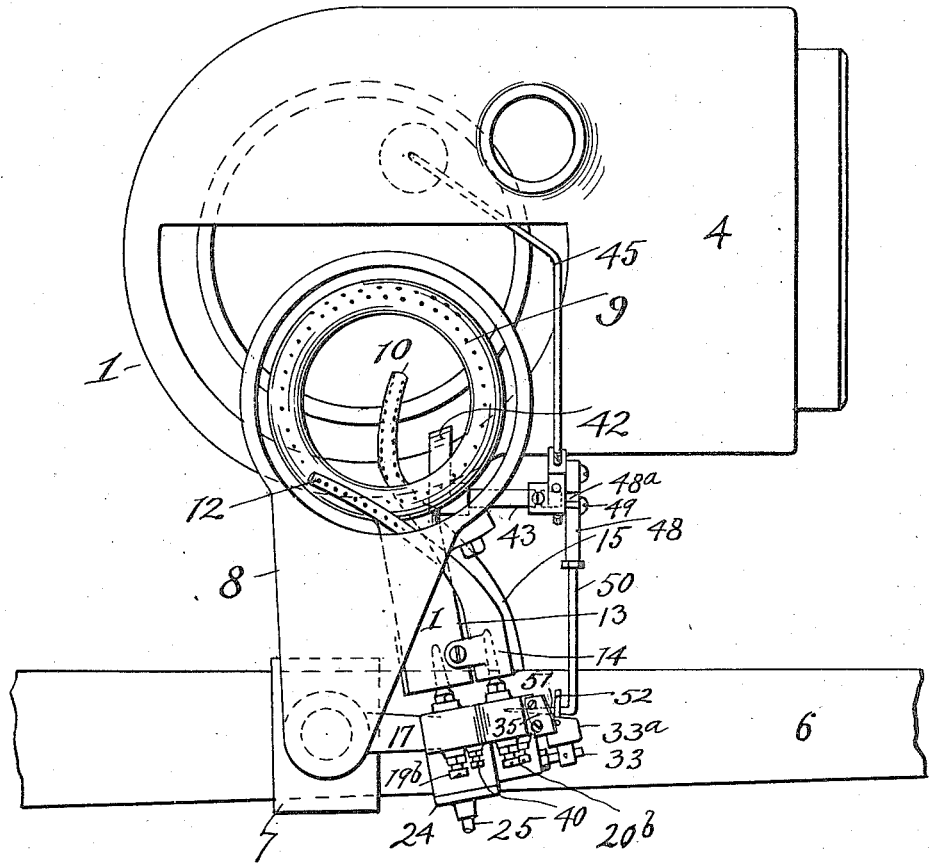

G. E. LEE.
DEVICE FOR CONTROLLING SUPPLY OF HEAT TO AN AUXILIARY HEATING DEVICE.
APPLICATION FILED FEB. 14, 1916.

1,228,794.  Patented June 5, 1917.

Inventor
George E. Lee
by Thurston ...
attys

G. E. LEE.
DEVICE FOR CONTROLLING SUPPLY OF HEAT TO AN AUXILIARY HEATING DEVICE.
APPLICATION FILED FEB. 14, 1916.
1,228,794.
Patented June 5, 1917.
3 SHEETS—SHEET 2.
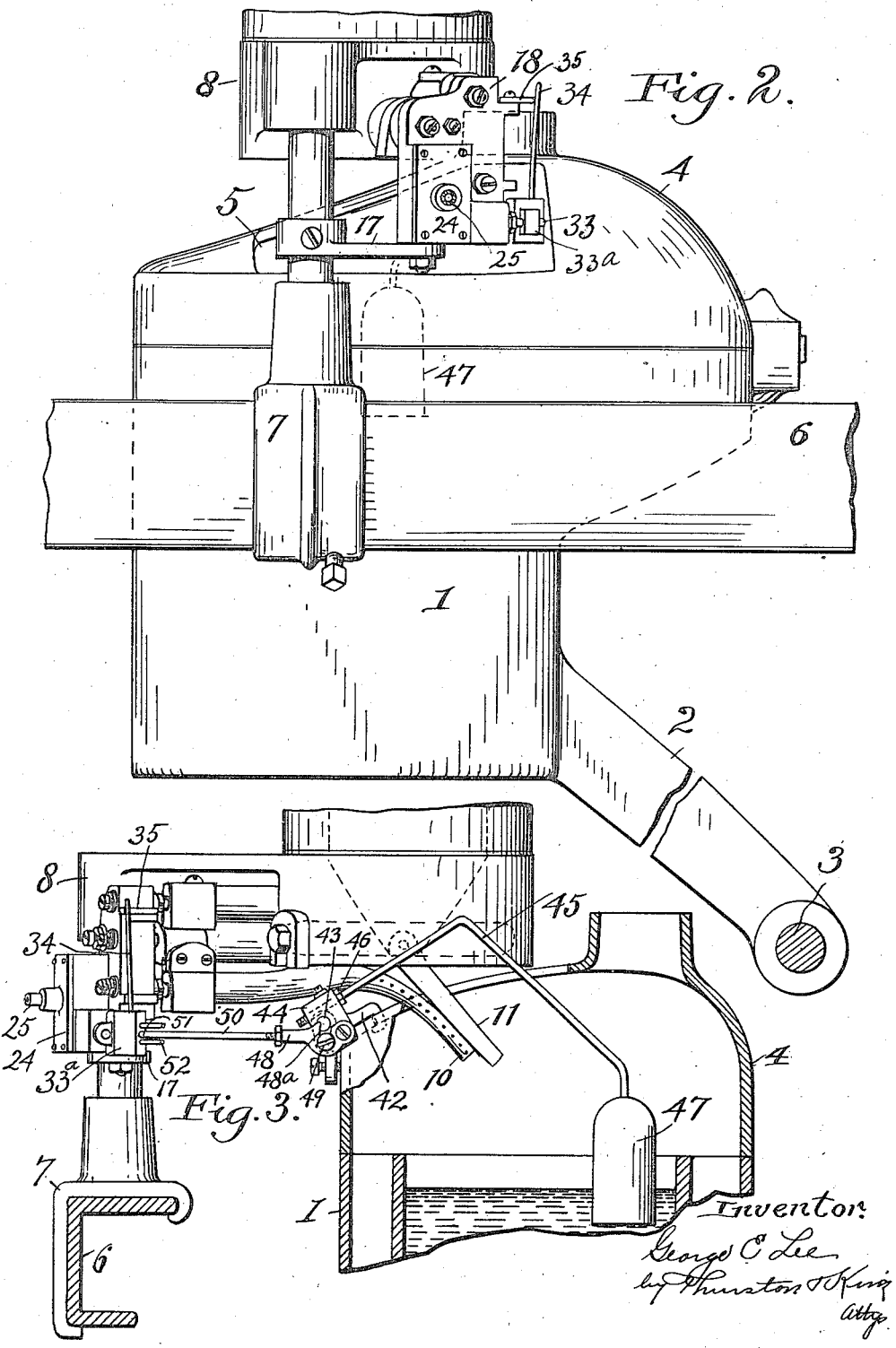

G. E. LEE.
DEVICE FOR CONTROLLING SUPPLY OF HEAT TO AN AUXILIARY HEATING DEVICE.
APPLICATION FILED FEB. 14, 1916.
1,228,794.
Patented June 5, 1917.
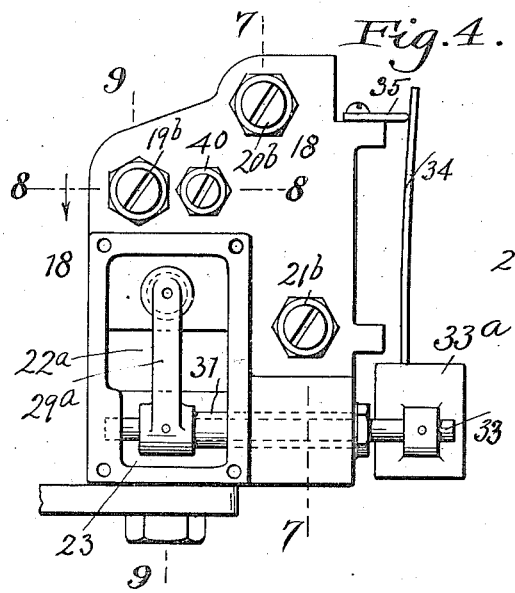
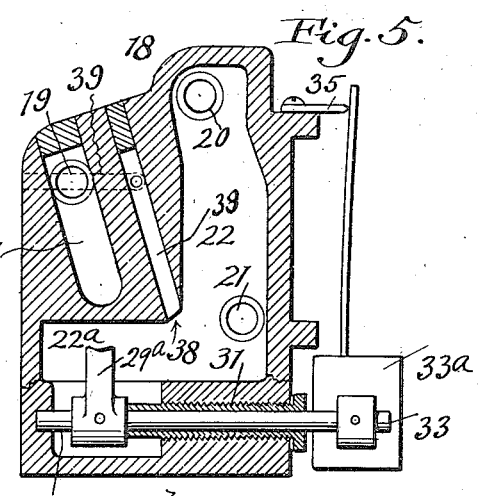
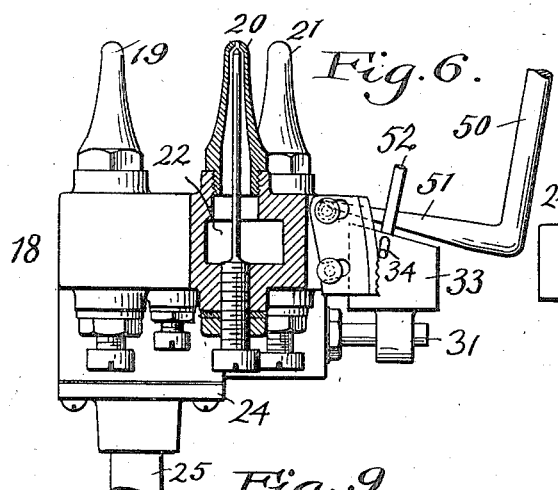
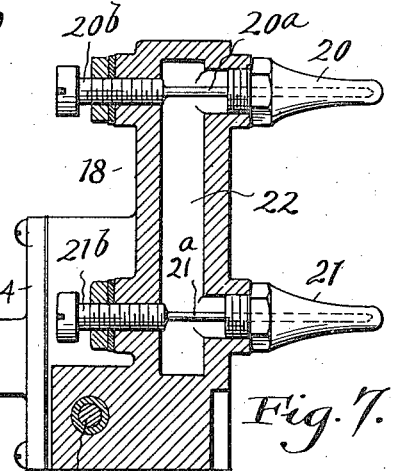
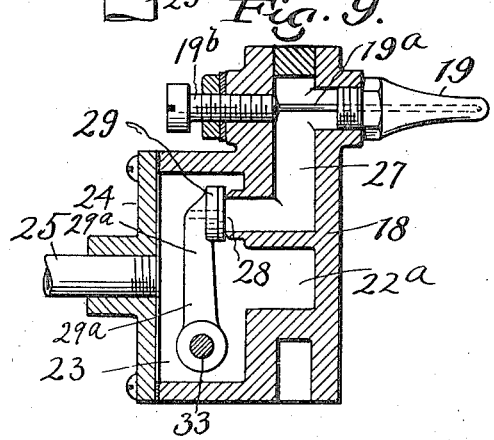
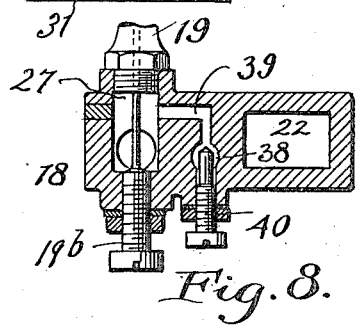
Inventor:
George E Lee

UNITED STATES PATENT OFFICE.

GEORGE E. LEE, OF CLEVELAND, OHIO, ASSIGNOR TO THE GEORGE E. LEE COMPANY, OF CLEVELAND, OHIO, A CORPORATION OF OHIO.

DEVICE FOR CONTROLLING SUPPLY OF HEAT TO AN AUXILIARY HEATING DEVICE.

1,228,794.     Specification of Letters Patent.    Patented June 5, 1917.

Application filed February 14, 1916. Serial No. 78,144.

*To all whom it may concern:*

Be it known that I, GEORGE E. LEE, a citizen of the United States, residing at Cleveland, in the county of Cuyahoga and State of Ohio, have invented a certain new and useful Improvement in Devices for Controlling Supply of Heat to Auxiliary Heating Devices, of which the following is a full, clear, and exact description.

This invention relates to an auxiliary melting device which supplies melted material in necessary quantities to a main melting pot in accordance with the requirements for melted material within the main melting pot. More particularly the invention is directed to the means for controlling the functioning of the heat supply for the auxiliary melting device.

The specific embodiment of the invention herein disclosed and described is applied to a type line casting machine in connection with the melting pot of which I employ an auxiliary melting device adapted to contain an ingot of type metal, heat being supplied to the ingot of metal at such times as the level of the molten metal in the melting pot falls below a predetermined or desired level. The device of my invention is particularly directed toward the controlling of the supply of heat by which the ingot of metal in the auxiliary melting device is melted as metal is needed.

I do not intend that the particular embodiment of the invention herein disclosed shall form any limitation to its application to other uses. The object of the invention is to provide a float control for such types of devices as have just been described. Other objects will appear as the description proceeds.

Generally speaking, the invention comprises the elements and combinations thereof set forth in the accompanying claims.

Reference should be had to the accompanying drawings forming a part of this specification, in which Figure 1 is a top plan view showing the melting pot of a type line casting machine, a portion of an auxiliary melting device and the device of my invention in its relation thereto; Fig. 2 is a side elevation of the showing in Fig. 1; Fig. 3 is an elevation with portions in section of my device and the parts in connection with which it operates; Fig. 4 is a front elevation of a part of my device with portions removed; Fig. 5 is a transverse section of the showing in Fig. 4; Fig. 6 is a top plan view of a portion of my device with certain parts in section; Fig. 7 is a section upon the line 7—7 of Fig. 4; Fig. 8 is a section upon the line 8—8 of Fig. 4; and Fig. 9 is a section upon the line 9—9 of Fig. 4.

In the drawing the melting pot of a type line casting machine is generally represented at 1. This pot is mounted upon an arm such as represented at 2, which arm is pivoted as represented at 3, the purpose of the pivoting of the pot being that the pot may move up to the mold of the type line casting machine at the time it is desired to cast a slug. The melting pot is provided with a cover 4 which has an opening 5.

At 6 there is represented a stationary portion of a type line casting machine, and upon this part 6 there is secured a bracket 7 which at its upper end pivotally supports a platform 8, the platform supporting some means for holding an ingot of type metal. This platform 8 also supports a burner 9, the same being the main burner for supplying heat by which the ingot of metal will be melted as desired.

There is also a burner 10 which extends down along a chute or guide 11 by which the metal, as it is melted from the ingot, is guided into the melting pot 1. There is also a pilot burner 12 which is adjacent the main burner 9 and functions in the usual and well understood way. The platform 8 supports the mixer 13 through which air and gas is supplied to the main burner 9, the mixer 14 by which air and gas is supplied to the pilot burner 12, and the mixer 15 through which air and gas is supplied to the burner 10.

There is an arm 17 which is secured upon the bracket 7. This arm extends laterally and supports a housing which is generally represented at 18. This housing is provided with nipples 19, 20 and 21, which nipples respectively supply gas to the main burner, the pilot burner and the burner for the chute 11. It will be understood from the drawing that these nipples extend into suitable openings formed in the mixers and the movement of the gas through the mixers entrains air in suitable proportions to effect combustion of the gas in the various burners, all of these being well understood and well known in the art of burners.

In Figs. 4 to 9 the construction of the housing 18 is clearly shown. This housing is provided with an inner chamber 22 which inner chamber is in communication with the nipples 20 and 21. The chamber 22 is provided with an extension 22ª, as seen in Figs. 5 and 9. The portion 22ª of the chamber 22 connects with another chambered portion 23, and this last mentioned chambered portion is provided with a lid or cover 24. Through this lid or cover there extends a pipe 25 by which gas or other heating fluid is supplied. It will be seen that the gas thus supplied through the pipe 25 will always be admitted and fill the chambers 22 and 23 so that gas will always be supplied through the nipples 20 and 21 at least so long as gas is supplied through the pipe 25. The flow of the gas through the nipples 20 and 21 will be regulated by needles 20ª and 21ª, these needles being regulated by means of threaded heads 20ᵇ and 21ᵇ, which extend upon the outside of the housing 18 and may be manipulated.

The housing 18 is also supplied with a chambered portion 27 which communicates with the nipple 19, the passage of gas through the nipple 19 being regulated by a needle 19ª which in turn is manipulated by a screw-threaded head 19ᵇ which extends upon the outside of the housing 18 so that the needle may be adjusted. Communicating with the chamber 27 is a port 28. This port is preferably circular and the upper walls come to an edge so as to afford a seat against which moves the head 29 of a lever 29ª. The head 29 is provided with a controller of suitable material, so that when the head 29 seats against the opening 28 no gas may pass to the chamber 27. In other words the lever and head 29 form a valve for controlling the passage of fluid fuel through port 28.

The lever 29ª is pivotally mounted upon a shaft 33. This shaft on one side of the lever 29ª has a bearing in the housing 18. On the other side of the lever there is a threaded bushing or sleeve 31 which encircles the shaft and bears against one side of the lever 29ª. The bushing 31 is threaded and is received in a suitable threaded opening in the housing 18. This bushing serves as a bearing for shaft 33, also to hold the lever in proper position within the housing and also effectually prevents the escape of any gas. It will be understood that the shaft 33 has a nice working fit within the bushing 31 so that it may turn with respect thereto. The shaft 33 extends upon the outside of the casing and at the end which is outside has secured thereto a member 33ª. This member is so placed on the shaft 31 that normally it is out of balance and would tend to turn the shaft 33 to close the passageway 28. The member 33ª carries a resilient finger 34 which coöperates with a serrated plate 35 which plate is mounted upon the housing 18. The finger 34 coöperates with the serrations in the plate 35, thereby holding the spring finger 34 in a definite position to which it may be moved, and this of course in turn means that the valve or head of the valve 29 is held in whatever position it is moved by the mechanism which operates it and so obviates any fluctuation and unsteadiness in the valve movement.

It will be observed that the plain portion of the plate 35 is beveled or slanting. The spring finger 34 is in contact with this portion of the plate when the valve is moving toward sealed position and the movement of the finger 34 along this surface assists the valve to its seat.

It will thus be seen that the gas is always and uninterruptedly supplied to the pilot burner and the burner which heats the chute. However, the gas which is supplied to the main burner of the auxiliary melting device is supplied only as needed. It is, however, desirable that sufficient gas be always admitted to the main burner so as to maintain a low flame. This for the reason that where gas is at times entirely shut off and then turned on at the main burner there is apt to be a back firing at the time of the ignition of the gas at the main burner.

This is obviated by supplying a small amount of gas to the burner just about enough to support ignition at the burner. The amount of heat supplied by such burning of gas at the main burner is not sufficient to produce any melting effect upon the metal within the auxiliary melting device.

This feature is provided for in the construction herein shown by having a passage 38 which is formed in the housing 18, and is in communication with the chamber 22. The passage 38 is in communication with an angular passage 39 which is more clearly shown in Fig. 8, which last mentioned passage communicates with the chamber 27 which supplies the main valve with gas.

It will be remembered that the supply of gas is always in communication with the chamber 22, hence gas in limited quantities will always be supplied to the chamber 27. The amount of gas which is thus permitted to pass through the passageway 38, 39, is governed by a valve which is generally represented at 40.

The mechanism by which the shaft 31 is operated is more clearly shown in Figs. 1, 2, 3.

The mechanism comprises a bracket 42 which is adapted to be mounted upon a melting pot adjacent the opening therein. Any desired manner of securing the bracket 42 may be used. This bracket has an extending post 43, as will be clearly seen from Fig. 1. The post at its outer end receives a member 44 which is so mounted upon the post 43 that it may turn about the same. The member 44 has an opening in it through which extends a rod 45. The rod is threaded and receives a nut 46 which holds it in adjusted position with respect to the member 44. The rod 45 is bent in the manner shown in Fig. 3 and at its end is secured to a float 47 which is adapted to be partially immersed in the molten material within the melting pot 1.

Upon the member 44 there is pivotally secured an arm 48. This arm is provided with an arcuate slot 48$^a$ which receives a screw 49. The screw occupies a threaded opening in the member 44 and when in tightened position holds the arm 47 in a definite position with respect to the member 44. It will be seen that the construction described is merely for purposes of adjustment. Extending from the arm 48 is a rod 50 which at its outer end is provided with a tapered hook portion 51. The portion 51 extends between two pins 52 which are carried by the member 33. It will be apparent that the rods 50 and 45 may be relatively adjusted to maintain any desired level of material within the pot.

As before explained, the melting pot 1 is pivoted so that it may move to place the mouth of the pot against the mold of the type line casting machine at the time when a slug is to be cast. The movement of the melting pot necessarily moves the float 47 as well as the rods 45 and 50 because all of these parts are mounted upon the melting pot 1. This, therefore requires some sort of a connection between the float and its connected parts and the other portions of the gas regulating device which are carried upon the relatively stationary portion of the type casting machine, and this connection must be such that there is no danger of operating the gas control valve for the main burner when the melting pot is moved. In the present instance I have provided the necessary connection by providing the hook portion 51 with tapered surfaces so that as the melting pot is tipped there will be no danger of the hook portion 51 contacting with the pins 52 merely because of the movement of the pot 51, although of course it is still perfectly possible for the portion 51 to engage with the pins 52 if there be any movement of the float due to such a change of level as requires the addition of more metal to the melting pot.

The operation of the device will be clearly understood it is believed from the foregoing description, but a description of the operation is here given as follows: At such times as the level of metal within the melting pot is sufficient, the float 47 will be in such position that the hook 51 of the rod 50 is bearing against the lower pin 52, which will insure that the head 29 of the valve which controls the gas to the main burner is in its closed position, so that the main burner is only being supplied with gas by way of the passages 38, 39, which as it will be recalled, merely supplies enough gas to support a very low flame at the main burner.

The head 29 of the gas control is definitely held in its position by the engagement of the spring finger 34 with one of the serrations in the plate 35.

When the depletion of the metal within the melting pot reaches the stage at which it is desirable to add more metal to the melting pot, the float 47 will have moved to such a position that the hook portion 51 of the rod 50 will be in engagement with the upper pin 52, and as it engages the pin 52 and presses against it it will move the spring finger from the beveled portion of plate into the first or succeeding serrations in the plate 35, thus definitely raising the head 29 of the gas control valve until it has opened it sufficiently for a full supply of fuel to pass through. It will be seen that the gas control valve for the main burner is definitely opened, and of course would be definitely closed by the reverse operation of the float 47 so that there is no fluctuation such as would be incident to any instability of the float if there were such a direct connection that the gas valve were subjected to all the slight variations to which the float 47 may be subjected.

In practice I have found that when the spring finger 34 is in contact with the first serration of the plate 35 the gas valve is sufficiently opened and in the operation of the device, it is only necessary for the head 51 of the arm 50 to move the spring finger over the point of the serration nearest the leveled portion of plate 35 and then the spring finger will seat itself in the serration.

In the closing operation of the valve, as soon as the head 51 of the arm 50 moves the spring finger 34 out of the serration, it comes in contact with the leveled surface of plate 34 and as the spring finger 34 is under slight tension, it will move along the leveled surface of plate 35 until the valve is moved to closed position.

It will be clear then that the spring finger not only serves as a retention device to hold the valve in a definite position but actually assists the valve to move to its open or closed position.

It will also be seen that as the distance between the pins 52 is but slightly greater than the diameter of the hook portion 51 at the base of the tapered portion that the head 29 will respond to any appreciable fluctuation in the volume of material in the metal pot.

What I claim is:

1. The combination with a movable melting pot of an auxiliary melting device mounted above the said melting pot and adapted to supply melted material to the said melting pot, a heating element for said auxiliary device, means through which heat furnishing media is supplied to the heating element, a movable member for interrupting or establishing such supply of heat furnishing media, a device mounted upon the pot and extending into the pot, and sensitive to the rise and fall of the material within the pot, and a connection between the means for interrupting the supply of heat furnishing media and the device which is mounted upon the pot to move the said means controlling the supply of heat furnishing media in accordance with the rise and fall of the level of the material in the pot, said connection embodying a sliding engagement between the said device and the said movable member controlling the supply of heat furnishing media whereby the melting pot may be moved without affecting the operative engagement between the aforesaid device and the aforesaid movable member.

2. The combination with a movable melting pot of an auxiliary melting device mounted above the said melting pot and adapted to supply melted material to the said melting pot, a heating element for said auxiliary device, means through which heat furnishing media is supplied to the heating element, a movable member for interrupting or establishing such supply of heat furnishing media, a float within the melting pot, said float being pivotally mounted upon the pot and responsive to the rise and fall of the metal in the pot, a connection between the said float and the means for controlling the supply of heat furnishing media to move the said means controlling the supply of heat furnishing media in accordance with the rise and fall of the level of the material in the pot, said connection embodying a sliding engagement between the said float and the said movable member controlling the supply of heat furnishing media whereby the melting pot may be moved without affecting the operative engagement between the aforesaid float and the aforesaid movable member.

3. The combination with a melting pot of an auxiliary melting device above the melting pot, a heating element associated with the auxiliary melting device, means for supplying heating media to the heating element, means for controlling the supply of heat furnishing media said means including a rotatable shaft, a pair of stop members carried by the shaft, a movable arm extending between said stop members, a device carried by the pot and sensitive to the rise and fall of the metal in the pot said device being operatively connected with the arm which extends between said stop members whereby movement imparted to the arm due to the rise and fall of the material within the pot will be imparted to one of the aforesaid stop members thereby to turn the shaft and operate the controlling means.

4. The combination with a melting pot of an auxiliary melting device including a heating element, means for supporting the said device above the melting pot, movable means for controlling the supply of heat furnishing media to the heating elements, an arm coöperating with said movable means and adapted to move the same, said arm being pivotally mounted upon the melting pot, a device associated with the material in the melting pot and responsive to the rise and fall of the level of the material within the pot, a connection between said device and the pivoted arm whereby the pivoted arm is moved in accordance with the rise and fall of the material within the pot and communicates its movement to the movable means for controlling the supply of heat furnishing media.

5. The combination with a melting pot of an auxiliary melting device, means for supporting the said device above the melting pot, of an auxiliary melting device adapted to supply melted material to the melting pot, a heating element for said auxiliary melting device, means for supporting the said device above the melting pot, movable means for controlling the supply of the heat furnishing media to the heating element, an arm coöperating with said movable means and adapted to move the same, said arm being pivotally mounted upon the melting pot, a second arm pivotally mounted upon the melting pot and operatively coöperating with the first mentioned arm, means whereby the said arms may be relatively adjusted, and a device associated with material in the melting pot and responsive to the rise and fall of the level of material within the pot, said device being connected with the second mentioned arm whereby both of said arms will be moved in accordance with the rise and fall of the material within the pot and communicate the movement of said device to the movable means for controlling the supply of heat furnishing media.

6. The combination with a melting pot of an auxiliary melting device adapted to supply melted material to said pot, a heating element associated with said device, means for supporting the said device above the melting pot, movable means for controlling the supply of the heat furnishing media to the heating element, a movable member swivelly mounted upon the said melting pot, an arm adjustably carried by said member, said arm coöperating with the said movable means for controlling the supply of heat furnishing media, a second arm mounted upon the said member and extending into the melting pot, a device associated with material in the melting pot and responsive to the rise and fall of the level of material within the pot, there being a connection between said device and the second mentioned arm whereby said arms are moved in accordance with the rise and fall of the material within the pot and communicate their movement to the movable means for controlling the supply of heat furnishing media.

7. The combination with a melting pot of auxiliary melting device above the melting pot, a heating element associated with the auxiliary melting device, means for supplying heating media to the heating element, means for controlling the supply of heat furnishing media, said means including a rotatable shaft, a pair of stop members carried by said shaft, a movable arm extending between said stop members, a device carried by the pot and sensitive to the rise and fall of the material in the pot said device being operatively connected with the arm which extends between said stop pinions whereby movement imparted to the arm due to the rise and fall of the material within the pot will be imparted to one of the aforesaid stop pinions thereby to turn the shaft, and means associated with said shaft for maintaining the shaft in a definite position to which it may be moved.

8. The combination with a melting pot of an auxiliary melting device above the melting pot, a heating element associated with the auxiliary melting device, means for supplying heating media to the heating element, means for controlling the supply of heat furnishing media, said means including a rotatable shaft, a pair of stop members carried by said shaft, a movable arm extending between said stop members, a device carried by the pot and sensitive to the rise and fall of the material in the pot said device being operatively connected with the arm which extends between said stop pinions whereby movement imparted to the arm due to the rise and fall of the material within the pot will be imparted to one of the aforesaid stop pinions thereby to turn the shaft, and a spring arm associated with the said shaft, a detent plate with which the said spring arm coöperates whereby the shaft is maintained in a definite position when it is moved by the said arm.

9. The combination with a melting pot of an auxiliary melting device above the melting pot, a heating element associated with the melting device, means for supplying heating media to the heating element, means for controlling the supply of the heat furnishing media said means including a rotatable shaft, a pair of stop members carried by the shaft, a movable arm having a portion which extends at substantially right angles to the stop members, the portion of said arm which coöperates with the stop members being provided with a taper.

10. The combination with a melting pot of an auxiliary melting device above the melting pot, a fluid fuel burner associated with the auxiliary melting device, a housing having a nipple through which fluid fuel is introduced into the burner, said housing having a source of fuel supply communicating with the interior of said housing, said housing having a chamber with which the source of fuel supply is constantly in communication, said housing having a second chambered portion, a valve controlling the passage of fluid fuel to the second chambered portion, said housing having a by-pass between the first and second chambered portions, means for controlling the passage of gas through said by-pass, and a device within the melting pot responsive to the rise and fall of the material within said pot and operative connections between the said device and the said valve whereby the valve is operated.

11. The combination with a melting pot of an auxiliary melting device above the melting pot, a fluid fuel burner associated with the auxiliary melting device, a housing, a source of fluid fuel supply connected with said housing, said housing having a chambered portion with which the source of fuel supply is always in communication, said housing having a second chambered portion, a nipple in communication with said second chambered portion and coöperating with the said burner to supply fuel thereto, a valve controlling the passage of fluid fuel to said second chamber, a shaft by which said valve is operated, said shaft extending upon the outside of the housing, a device carried by the pot and sensitive to the rise and fall of the metal in the pot said device being operatively connected to the said shaft thereby to impart movement to said shaft due to the rise and fall of the material within the pot.

12. The combination with a melting pot of an auxiliary melting device above the melting pot, a main burner associated with said auxiliary melting device, a pilot burner associated with the first mentioned burner, a housing supported adjacent to the said burner, a source of fluid fuel supply with which the interior of said housing is in communication, a chambered portion within said housing which is always in communication with the source of fuel supply, and a nipple communicating with said chamber and associated with the pilot burner, a second chambered portion within the housing, a valve for controlling the admission of fluid fuel from the first chambered portion into the second chambered portion, a nipple in communication with said second chambered portion and associated with the main burner to supply fuel thereto, a shaft for operating said valve and extending upon the outside of said housing, a device carried by the pot and sensitive to the rise and fall of the material within the pot, said device being operatively connected with the said shaft whereby movement is imparted to the shaft due to the rise and fall of the material within the pot.

13. The combination with a melting pot, of an auxiliary melting device above the melting pot, a main burner associated with the auxiliary melting device, a housing, a chambered portion within said housing, a source of fluid fuel supply communicating with the said chambered portion of the housing, a nipple carried by the housing and coöperating with the pilot burner to supply fuel thereto, a second chambered portion within the housing, a nipple communicating with said chamber and associated with the main burner for supplying fuel thereto, a port associated with the second chambered portion through which fluid fuel passes to said second chambered portion, a shaft extending through the housing, an arm having a valve head which controls the said port said shaft extending upon the outside of the housing, a device carried by the pot and sensitive to the rise and fall of the metal in said pot, operative connections between the said shaft and the said device whereby movement is imparted to the shaft due to the rise and fall of the material within the pot.

14. The combination with a melting pot, of an auxiliary melting device above the melting pot, a main burner associated with said auxiliary melting device, a pilot burner associated with the first mentioned burner, a chute for conducting metal depending from the auxiliary melting device and extending into the metal pot, a burner associated with said chute, a housing supported adjacent the auxiliary melting device, a source of fluid fuel supply with which the interior of said housing is in communication, a chambered portion which is within said housing which is always in communication with the source of fuel supply, a nipple communicating with the said chamber and associated with the pilot burner, another nipple communicating with the said chamber and associated with the burner for the chute, a second chambered portion in the housing, a valve for controlling the admission of fluid fuel from the first chambered portion into the second chambered portion, a nipple in communication with said second chambered portion and associated with the main burner to supply fuel thereto, mechanism for operating said valve, said mechanism extending upon the outside of said housing, a device carried by the pot and sensitive to the rise and fall of the material within the pot, said device being operatively connected with the mechanism for operating the valve whereby the valve is operated due to the rise and fall of the material within the pot.

15. The combination with a melting pot, of an auxiliary melting device above the melting pot, a main burner associated with said auxiliary melting device, a pilot burner associated with the first mentioned burner, a housing supported adjacent the auxiliary melting device, a source of fluid fuel supply with which the interior of said housing is in communication, a chambered portion which is within said housing which is always in communication with the source of fuel supply, a nipple communicating with the said chamber and associated with the pilot burner, a second chambered portion in the housing, a valve for controlling the admission of fluid fuel from the first chambered portion into the second chambered portion, a nipple in communication with said second chambered portion and associated with the main burner to supply fuel thereto, mechanism for operating said valve, said mechanism extending upon the outside of said housing, a device carried by the pot and sensitive to the rise and fall of the material within the pot, said device being operatively connected with the mechanism for operating the valve whereby the valve is operated due to the rise and fall of the material within the pot.

16. The combination with a melting pot, of an auxiliary melting device for supplying molten material to the pot, said device having a heating element, means for supporting the said device stationarily with respect to said pot and above the pot, means for controlling the supply of the heat furnishing media to the heating element, a device carried by the pot and sensitive to the rise and fall of the material in the pot, and a connection between the said mentioned device and the means for controlling the supply of heat furnishing media to operate said means in accordance with the rise and fall of the level of the material in the pot, a plate having notches and a slanting edge, a spring finger associated with the movable means for controlling the supply of heat furnishing media, the spring finger coöperating with the slanting edge when the valve is moved to closed position and with a notch or notches when the valve is moved to open position.

17. The combination with a melting pot, of an auxiliary melting device for supplying molten material to the pot, said device having a fluid fuel burner, means for supporting said device above the said pot, a valve for controlling the supply of fluid fuel to said burner, a device carried by the pot sensitive to the rise and fall of the material within the pot, a connection between the last mentioned device and the said valve to operate the valve in accordance with the rise and fall of the level of the material in the pot, a plate having notches and a slanting edge, a spring finger associated with the said valve, the spring finger coöperating with the slanting edge when the valve is moved to closed position and with a notch or notches when the valve is moved to open position.

In testimony whereof, I hereunto affix my signature.

GEORGE E. LEE.